(12) United States Patent
Herzog et al.

(10) Patent No.: US 8,774,069 B2
(45) Date of Patent: Jul. 8, 2014

(54) METHOD AND SYSTEM FOR SYNCHRONIZED MAPPING OF DATA PACKETS IN AN ATSC DATA STREAM

(75) Inventors: Norman Herzog, Berlin (DE); Jens Rusch-Ihwe, Brandenburg an der Havel (DE); Michael Simon, Frederick, MD (US); Michael Kramer, Dillishausen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 165 days.

(21) Appl. No.: 12/468,938

(22) Filed: May 20, 2009

(65) Prior Publication Data

US 2010/0111109 A1 May 6, 2010

Related U.S. Application Data

(60) Provisional application No. 61/111,761, filed on Nov. 6, 2008, provisional application No. 61/161,445, filed on Mar. 19, 2009.

(51) Int. Cl.
*H04B 7/00* (2006.01)
*H04N 21/2381* (2011.01)
*H04N 21/61* (2011.01)
*H04L 27/02* (2006.01)
*H04L 1/00* (2006.01)
*H04H 20/57* (2008.01)

(52) U.S. Cl.
CPC ............ *H04L 27/02* (2013.01); *H04N 21/2381* (2013.01); *H04N 21/6131* (2013.01); *H04L 1/0041* (2013.01); *H04H 20/57* (2013.01)
USPC ....... 370/310; 370/329; 375/240.01; 375/295

(58) Field of Classification Search
CPC .. H04N 21/41407; H04H 20/30; H04H 20/57
USPC .............. 370/474, 310, 329; 375/240.01, 295
See application file for complete search history.

(56) References Cited

U.S. PATENT DOCUMENTS 5,073,980 A 12/1991 Prucnal et al.
5,216,503 A 6/1993 Paik et al.
(Continued)

FOREIGN PATENT DOCUMENTS

DE 199 60 295 6/2001
DE 196 17 293 11/2001
(Continued)

OTHER PUBLICATIONS

ATSC Digital Television Standard (A/53) Revision E, Advanced Television Systems Committee, Dec. 27, 2005.

(Continued)

*Primary Examiner* — Mark Rinehart
*Assistant Examiner* — Mang Yeung
(74) *Attorney, Agent, or Firm* — Fitzpatrick, Cella, Harper & Scinto

(57) ABSTRACT

Mapping data packets of a first data stream into data fields of a second data stream at several transmitters is provided by generating a first data stream with first data packets containing data associated with stationary receivers and second data packets containing data associated with mobile receivers in a head-end, where second data packets at the start of a group of consecutively transmitted second data packets contain placeholders into which signaling information is filled. A first data stream is transmitted from the head-end to each transmitter. Each transmitter extracts signaling information from the second data packets indicating in which data slot and in which data sub-frame of a received data frame the second data packet is transferred. Each transmitter inserts synchronization data in a specific data packet in each data slot containing second data packets. The first and second data packets are mapped consecutively into the second data stream.

98 Claims, 5 Drawing Sheets

(56) References Cited

U.S. PATENT DOCUMENTS

Figure 1:
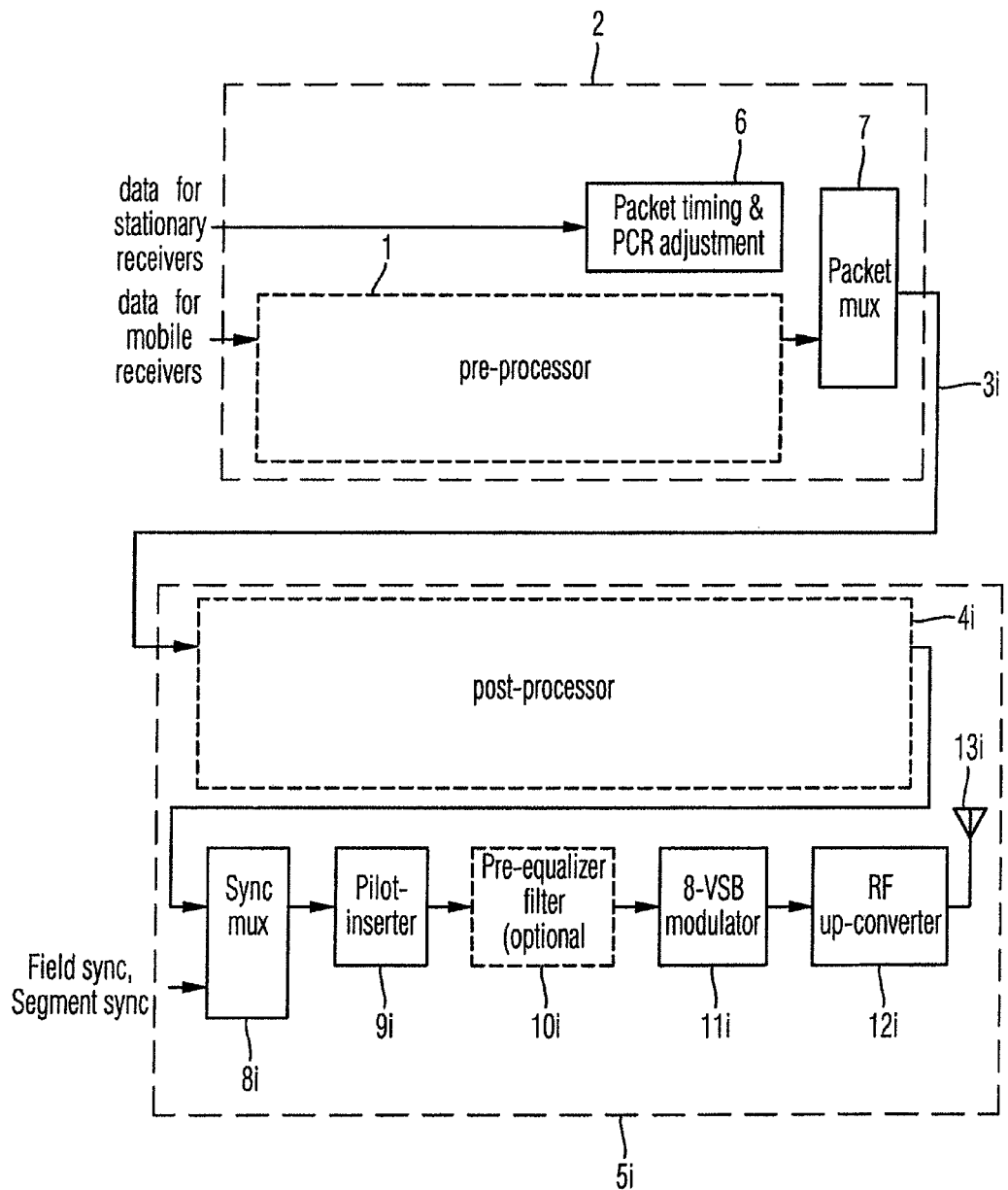

| | | |
|---|---|---|
| 5,506,844 A | 4/1996 | Rao |
| 5,614,914 A | 3/1997 | Bolgiano et al. |
| 5,835,493 A | 11/1998 | Magee et al. |
| 5,903,574 A | 5/1999 | Lyons |
| 5,966,120 A | 10/1999 | Arazi et al. |
| 6,005,605 A | 12/1999 | Kostreski et al. |
| 6,088,337 A | 7/2000 | Eastmond et al. |
| 6,118,797 A | 9/2000 | O'Shea |
| 6,130,898 A | 10/2000 | Kostreski et al. |
| 6,192,070 B1 | 2/2001 | Poon et al. |
| 6,269,092 B1 | 7/2001 | Schilling |
| 6,313,885 B1 | 11/2001 | Patel et al. |
| 6,324,186 B1 | 11/2001 | Mahn |
| 6,335,766 B1 | 1/2002 | Twitchell et al. |
| 6,414,720 B1 | 7/2002 | Tsukidate et al. |
| 6,477,180 B1 | 11/2002 | Aggarwal et al. |
| 6,480,236 B1 | 11/2002 | Limberg |
| 6,496,477 B1 | 12/2002 | Perkins et al. |
| 6,507,618 B1 | 1/2003 | Wee et al. |
| 6,580,705 B1 | 6/2003 | Riazi et al. |
| 6,631,491 B1 | 10/2003 | Shibutani et al. |
| 6,640,239 B1 | 10/2003 | Gidwani |
| 6,678,260 B2 | 1/2004 | Proctor, Jr. |
| 6,717,933 B1 | 4/2004 | Sonning et al. |
| 6,721,337 B1 | 4/2004 | Kroeger et al. |
| 6,727,847 B2 | 4/2004 | Rabinowitz et al. |
| 6,728,467 B2 | 4/2004 | Oshima |
| 6,744,789 B1 | 6/2004 | Michener |
| 6,772,434 B1 | 8/2004 | Godwin |
| 6,801,499 B1 | 10/2004 | Anandakumar et al. |
| 6,804,223 B2 | 10/2004 | Hoffmann et al. |
| 6,816,204 B2 | 11/2004 | Limberg |
| 6,861,964 B2 | 3/2005 | Breti et al. |
| 6,862,707 B2 | 3/2005 | Shin |
| 6,879,720 B2 | 4/2005 | Sarachik et al. |
| 6,930,983 B2 | 8/2005 | Perkins et al. |
| 6,996,133 B2 | 2/2006 | Bretl et al. |
| 7,110,048 B2 | 9/2006 | Weiss |
| 7,111,221 B2 | 9/2006 | Birru et al. |
| 7,197,685 B2 | 3/2007 | Limberg |
| 7,310,354 B2 | 12/2007 | Fimoff et al. |
| 7,324,545 B2 | 1/2008 | Chuah et al. |
| 7,336,646 B2 | 2/2008 | Muller |
| 7,349,675 B2 | 3/2008 | Karr et al. |
| 7,382,838 B2 | 6/2008 | Peting |
| 7,496,094 B2 | 2/2009 | Gopinath et al. |
| 7,532,677 B2 | 5/2009 | Simon |
| 7,532,857 B2 | 5/2009 | Simon |
| 7,539,247 B2 | 5/2009 | Choi et al. |
| 7,551,675 B2 | 6/2009 | Kroeger |
| 7,554,912 B2 | 6/2009 | Rodriguez-Sanchez et al. |
| 7,558,279 B2 | 7/2009 | Hwang et al. |
| 7,564,905 B2 | 7/2009 | Park et al. |
| 7,593,474 B2 | 9/2009 | Jeong et al. |
| 7,599,348 B2 | 10/2009 | Kang et al. |
| 7,602,749 B2 | 10/2009 | Proctor, Jr. |
| 7,626,960 B2 | 12/2009 | Muller |
| 7,667,780 B2 | 2/2010 | Weiss |
| 7,702,337 B2 | 4/2010 | Vare et al. |
| 7,715,491 B2 | 5/2010 | Yu et al. |
| 7,733,819 B2 * | 6/2010 | Lee et al. ............... 370/312 |
| 7,779,327 B2 | 8/2010 | Lee et al. |
| 7,783,316 B1 | 8/2010 | Mitchell |
| 7,801,181 B2 * | 9/2010 | Song et al. ............... 370/478 |
| 7,804,909 B2 | 9/2010 | Choi et al. |
| 7,822,134 B2 | 10/2010 | Kim et al. |
| 7,830,974 B2 | 11/2010 | Choi et al. |
| 7,852,961 B2 | 12/2010 | Chang et al. |
| 7,856,590 B2 | 12/2010 | Kim et al. |
| 7,933,351 B2 | 4/2011 | Kim et al. |
| 8,009,662 B2 | 8/2011 | Lee et al. |
| 2001/0017849 A1 | 8/2001 | Campanella et al. |
| 2002/0085548 A1 | 7/2002 | Ku et al. |
| 2002/0170060 A1 | 11/2002 | Lyman |
| 2003/0032389 A1 | 2/2003 | Kim et al. |
| 2003/0053493 A1 | 3/2003 | Graham Mobley et al. |
| 2003/0099303 A1 | 5/2003 | Birru et al. |
| 2003/0100267 A1 | 5/2003 | Itoh et al. |
| 2003/0128826 A1 | 7/2003 | Benini et al. |
| 2003/0206596 A1 | 11/2003 | Carver et al. |
| 2005/0013249 A1 | 1/2005 | Kong et al. |
| 2005/0044475 A1 | 2/2005 | Yedidia et al. |
| 2005/0046600 A1 | 3/2005 | Bretl et al. |
| 2005/0074074 A1 | 4/2005 | Limberg |
| 2005/0084023 A1 | 4/2005 | Bott et al. |
| 2005/0147186 A1 | 7/2005 | Funamoto et al. |
| 2005/0207416 A1 | 9/2005 | Rajkotia |
| 2005/0238100 A1 | 10/2005 | Hsiao et al. |
| 2005/0249300 A1 | 11/2005 | Jeong et al. |
| 2005/0249301 A1 | 11/2005 | Jeong et al. |
| 2006/0002464 A1 | 1/2006 | Choi et al. |
| 2006/0023656 A1 | 2/2006 | Anglin, Jr. |
| 2006/0050770 A1 | 3/2006 | Wallace et al. |
| 2006/0067266 A1 | 3/2006 | Ehlers et al. |
| 2006/0093045 A1 | 5/2006 | Anderson et al. |
| 2006/0126556 A1 | 6/2006 | Jiang et al. |
| 2006/0200852 A1 | 9/2006 | Simon |
| 2006/0200853 A1 | 9/2006 | Simon |
| 2006/0211436 A1 | 9/2006 | Paila et al. |
| 2006/0244865 A1 | 11/2006 | Simon |
| 2006/0245516 A1 | 11/2006 | Simon |
| 2007/0066272 A1 | 3/2007 | Vassiliou et al. |
| 2007/0074267 A1 | 3/2007 | Clerget et al. |
| 2007/0091857 A1 | 4/2007 | Elstermann |
| 2007/0143810 A1 | 6/2007 | Yousef |
| 2007/0174880 A1 | 7/2007 | Fite et al. |
| 2007/0189410 A1 | 8/2007 | Zeng |
| 2007/0230460 A1 | 10/2007 | Jeong et al. |
| 2008/0056219 A1 | 3/2008 | Venkatachalam |
| 2008/0175148 A1 | 7/2008 | Todd et al. |
| 2008/0181112 A1 | 7/2008 | Beck et al. |
| 2008/0205215 A1 | 8/2008 | Kikuchi et al. |
| 2008/0209464 A1 | 8/2008 | Wright-Riley |
| 2008/0211969 A1 | 9/2008 | Simon et al. |
| 2008/0247442 A1 | 10/2008 | Orlik et al. |
| 2008/0254739 A1 | 10/2008 | Kidd et al. |
| 2008/0259835 A1 | 10/2008 | Venkatachalam et al. |
| 2008/0273698 A1 | 11/2008 | Manders et al. |
| 2009/0003432 A1 | 1/2009 | Liu et al. |
| 2009/0013356 A1 | 1/2009 | Doerr et al. |
| 2009/0016435 A1 | 1/2009 | Brandsma et al. |
| 2009/0034442 A1 | 2/2009 | Song et al. |
| 2009/0040962 A1 | 2/2009 | Oger et al. |
| 2009/0100459 A1 | 4/2009 | Riedl et al. |
| 2009/0175355 A1 | 7/2009 | Gordon et al. |
| 2009/0201997 A1 | 8/2009 | Kim et al. |
| 2009/0228764 A1 | 9/2009 | Lee et al. |
| 2009/0228765 A1 | 9/2009 | Lee et al. |
| 2009/0252266 A1 | 10/2009 | Heinemann et al. |
| 2009/0265751 A1 * | 10/2009 | Limberg .................. 725/118 |
| 2009/0293086 A1 | 11/2009 | Lutterbach et al. |
| 2010/0023972 A1 | 1/2010 | Summers et al. |
| 2010/0142446 A1 | 6/2010 | Schlicht et al. |
| 2010/0142447 A1 | 6/2010 | Schlicht et al. |
| 2010/0150182 A1 | 6/2010 | Noronha, Jr. |
| 2010/0246506 A1 | 9/2010 | Krishnaswamy |
| 2010/0254449 A1 | 10/2010 | Rusch-Ihwe |
| 2011/0004912 A1 | 1/2011 | Teniou et al. |
| 2011/0170015 A1 | 7/2011 | Kim et al. |
| 2011/0230202 A1 | 9/2011 | Wood et al. |

FOREIGN PATENT DOCUMENTS

| | | |
|---|---|---|
| DE | 101 12 773 | 9/2002 |
| DE | 10 2006 015 393 | 10/2007 |
| DE | 10 2007 012 465 | 5/2008 |
| EP | 0 837 609 | 4/1998 |
| EP | 0 926 894 | 6/1999 |
| EP | 1 079 631 A1 | 2/2001 |
| EP | 1 337 071 A2 | 8/2003 |
| EP | 1 670 150 | 6/2006 |
| EP | 1 753 249 | 2/2007 |
| EP | 1 950 962 A1 | 7/2008 |
| EP | 1 965 386 A1 | 9/2008 |

(56) References Cited

FOREIGN PATENT DOCUMENTS

| | | |
|---|---|---|
| EP | 1 965 389 A2 | 9/2008 |
| GB | 2 399 719 | 9/2004 |
| WO | WO-02/03728 | 1/2002 |
| WO | WO-03/009590 | 1/2003 |
| WO | WO-03/045064 | 5/2003 |
| WO | 2004/062183 A1 | 7/2004 |
| WO | WO 2004/062283 | 7/2004 |
| WO | WO-2007/114653 | 10/2004 |
| WO | WO-2006/046107 | 5/2006 |
| WO | WO 2006/066617 | 6/2006 |
| WO | WO-2006/084361 | 8/2006 |
| WO | WO-2007/046672 | 4/2007 |
| WO | WO-2008/042694 | 4/2008 |
| WO | 2008/100000 A1 | 8/2008 |
| WO | 2008/117981 A1 | 10/2008 |
| WO | WO-2009/016175 | 2/2009 |
| WO | WO-2010/000407 | 1/2010 |

OTHER PUBLICATIONS

ATSC Recommended Practice: Design of Synchronized Multiple Transmitter Networks (A/111), Advanced Television Systems Committee, Sep. 3, 2004.

ATSC Standard: Synchronization Standard for Distributed Transmission (A/110), Advanced Television Systems Committee, Jul. 14, 2004.

ATSC Standard: Synchronization Standard for Distributed Transmission, Revision A (A/110A), Advanced Television Systems Committee, Jul. 19, 2005.

ATSC Standard: Synchronization Standard for Distributed Transmission, Revision B (A/110B), Advanced Television Systems Committee, Dec. 24, 2007.

ATSC Technology Group Report: DTV Signal Reception and Processing Considerations, Doc. T3-600r4, Advanced Television Systems Committee, Sep. 18, 2003.

Battisa, "Spectrally Efficient High Data Rate Waveforms for The UFO SATCOM Channel", Military Communications Conference, MILCOM 98, Proceedings, Oct. 18-21, 1998, pp. 134-139, IEEE vol. 1.

Citta, R., et al., "ATSC Transmission System: VSB Tutorial", Zenith Electronics Corporation, Symposium Handout, Montreuz Symposium, Jun. 12, 1997.

"Digital Video Broadcasting (DVB); DVB Mega-Frame for Single Frequency Network (SFN) Synchronization", European Broadcasting Union; eTSI TS 101 191 v1.4.1, Jun. 2004.

International Preliminary Report on Patentability, PCT/US2006/007265, Oct. 4, 2007.

International Preliminary Report on Patentability, PCT/EP2008/000837, Aug. 6, 2009.

International Preliminary Report on Patentability, PCT/US2006/020599, Nov. 30, 2007.

International Preliminary Report on Patentability, PCT/US2006/022300, Dec. 27, 2007.

International Search Report and Written Opinion of the International Searching Authority, PCT/EP2008/000837, Aug. 12, 2008.

International Search Report and Written Opinion of the International Searching Authority, PCT/US2006/007251, May 20, 2008.

International Search Report and Written Opinion of the International Searching Authority, PCT/US2006/007265, Sep. 4, 2007.

International Search Report and Written Opinion of the International Searching Authority, PCT/US2006/015317, May 14, 2008.

International Search Report and Written Opinion of the International Searching Authority, PCT/US2006/020599, Aug. 31, 2007.

International Search Report and Written Opinion of the International Searching Authority, PCT/US2006/022300, Mar. 29, 2007.

Lecture 4: Digital Television The DVB transport stream, obtained from http://www.abo.fi/~jbjorkqv/digitv/lect4.pdf (last visited May 4, 2006).

Lee, Y., et al., "ATSC Terrestrial Digital Television Broadcasting Using Single Frequency Networks", ETRI Journal, Apr. 2004, pp. 92-100, vol. 26, No. 2.

Owen, H., "Proposed Modifications to ATSC Digital Television Standard to Improve Performance in the Face of Dynamic Multipath for Both Fixed and Mobile Operation", Sarnoff Corporation, Apr. 2, 2001, Princeton, New Jersey.

Patel, C. B., et al., "Proposal to ATSC Subcommittee T3/S9 to Provide 8-VSB With a Repetitive-PN1023 Signal for Rapidly and Reliably Initializing Tracking in an Adaptive Equalizer Despite Adverse Multipath Conditions", Apr. 12, 2001.

Proposal for Enhancement of ATSC RF Transmission System (Revision to A/53), submitted by Samsung, Draft ver. 1.0, Sep. 16, 2004.

Raghunandan, K., "Satellite Digital Audio Radio Service (SDARS) System Architecture and Receiver Review", IEEE, Oct. 27, 2005.

Vogel, W. J., et al., "Propagation Effects and Satellite Radio Design", Paper No. 1445, Maastricht Exhibition and Congress Centre (MECC), Aug. 17-24, 2002, Maastricht, the Netherlands.

Wang, "A New Implementation of Single Frequency Network Based on DMB-T", 2004 International Conference on Communications, Circuits and Systems (2004 ICCCAS), Jun. 27-29, 2004, pp. 246-249, vol. 1.

Wang, X., et al., "Transmitter Identification in Distributed Transmission Network and Its Applications in Position Location and a New Data Transmission Scheme", NAB Broadcast Engineering Conference, Apr. 16-21, 2005, pp. 511-520, Las Vegas, Nevada.

Whitaker, J. C., "Standard Handbook of Video and Television Engineering", Chapter 17.2 "ATSC DTV Received Systems", 2000, pp. 17-63 to 17-99.

"ATSC-Mobile DTV Standard, Part 3—Service Multiplex and Transport Subsystem Characteristics", Advanced Television Systems Committee, Inc., Document A/153 Part 3:2009, Oct. 15, 2009, pp. 14-25.

ATSC Digital Television Standard (A/53), "Annex D: RF/Transmission Systems Characteristics", Sep. 16, 1995, pp. 46-60.

"European Broadcasting Union Union Europeenne de Radio-Television Digital Video Broadcasting (DVB); Specification for Service Information (SI) in DVB systems; ETS 300 468", ETSI Standards, Lis, Sophia Antipolis Cedex, France, vol. BC, Second Edition, Jan. 1, 1997, pp. 1-72.

"Universal Mobile Telecommunication Systems (UMTS); Introduction of the Multimedia Broadcast/Multicast Service (MBMS) in the Radio Access Network (RAN); Stage 2" (3GPP TS 25.346 version 7.4.0 Release 7); ETSI TS 125 346 No. V7.4.0 (Jun. 2007), IEEE, Lis, Sophia Antipolis Cedex, France, vol. 3-R2, No. V7.4.0, Jun. 1, 2007.

"ATSC Digital Television Standard (A/53) Revision E with Amendment No. 1", Advanced Television Systems Committee, Apr. 18, 2006, pp. 45-91.

Yucek, T., et al., "A Survey of Spectrum Sensing Algorithms for Cognitive Radio Applications," IEEE Communications Surveys & Tutorials, Mar. 4, 2009, pp. 116-130, vol. 11, No. 1.

Peha, J. M., "Sharing Spectrum Through Spectrum Policy Reform and Cognitive Radio," Proceedings of the IEEE, Apr. 2009, pp. 708-719, vol. 97, No. 4.

Zhao, Y., et al., "Experimental Study of Utility Function Selection for Video Over IEEE 802.22 Wireless Regional Area Networks," 5th International Conference on Testbeds and Research Infrastructures for the Development of Networks & Communities and Workshops, 2009, Dates of Conference: Apr. 6-8, 2009, pp. 1-10.

Lee, J. M., et al., "Adaptive Hybrid Transmission Mechanism for On-Demand Mobile IPTV Over WiMax," IEEE Transactions on Broadcasting, Jun. 2009, pp. 468-477, vol. 55, No. 2.

Wen C. C., et al., "Hybrid Tree Based Explicit Routed Multicast for QoS Supported IPTV Service," Proceedings of the IEEE Global Telecommunications Conference, 2009, Dates of Conference: Nov. 30, 2009-Dec. 4, 2009, pp. 1-6.

Ding, J. W., et al., "Quality-Aware Bandwidth Allocation for Scalable On-Demand Streaming in Wireless Networks," IEEE Journal on Selected Areas in Communications, Apr. 2010, pp. 366-376, vol. 28, No. 3.

Sachs, J., et al., "Cognitive Cellular Systems Within the TV Spectrum," IEEE Symposium on New Frontiers in Dynamic Spectrum, 2010, Dates of Conference: Apr. 6-9, 2010, pp. 1-12.

(56) References Cited

OTHER PUBLICATIONS

Karimi, H. R., et al., "European Harmonized Technical Conditions and Band Plans for Broadband Wireless Access in the 790-862 MHz Digital Dividend Spectrum," IEEE Symposium on New Frontiers in Dynamic Spectrum, 2010, Dates of Conference: Apr. 6-9, 2010, pp. 1-9.

Lee et al., "ATSC Terrestrial Digital Television Broadcasting Using Single Frequency Networks", XP-002556814, ETRI Journal, vol. 26, No. 2, Apr. 2004, pp. 92-100.

"ATSC Digital Television Standard (Annex D), RF/Transmission Systems Characteristics", Advanced Television Systems Committee, Sep. 16, 1995, pp. 46-60.

* cited by examiner

| Data Packet | Content |
|---|---|
| 1 | 4446666666666665226666666666666666666666666666666666666666666666522 6666666666666666666666666666666666666666666666522666666666666666666 666666666666666666666666666665266666666666666626666666666666666 |
| 2 | 444666666666666552666666666666666666666666666666666666666666666666655 266666666666666666666666666666666666666666666666655266666666666666666 666666666666666666666666666651266666666666666626666666666666666 |

US 8,774,069 B2

METHOD AND SYSTEM FOR SYNCHRONIZED MAPPING OF DATA PACKETS IN AN ATSC DATA STREAM

CROSS REFERENCE TO RELATED APPLICATION

This application claims priority to, and the benefit of, U.S. Provisional Patent Application Ser. Nos. 61/111,761, filed Nov. 6, 2008, and 61/161,445, filed on Mar. 19, 2009, both of which are hereby incorporated by reference in their entirety.

FIELD

The invention generally relates to communication systems, and more particularly to synchronized mapping of data packets in an ATSC data stream.

RELATED ART

In a transmission system for digital television corresponding to the Advanced Television Systems Committee Mobile Handheld (ATSC-M/H (A/153)) standard, the transmitted data stream contains both digital TV data for stationary receivers and digital TV data for mobile receivers. An example of such a transmission system is described in U.S. patent application Ser. No. 11/422,791, which is hereby incorporated by reference in its entirety.

FIG. 1 depicts a block diagram of an ATSC-M/H transmission system with pre- and post-processing. As shown in FIG. 1, the signal processing of digital TV data is performed in a pre-processor 1 at the head-end 2 (e.g., in a studio) and is continued after transmission of the pre-processed digital TV data over a studio-transmitter-link $3_1, 3_2, \ldots, 3_i, \ldots, 3_n$ in a post-processor $4_1, 4_2, \ldots, 4_i, \ldots, 4_n$ at each remote positioned transmitter $5_1, 5_2, \ldots, 5_i, \ldots, 5_n$. In the pre-processor 1, data for mobile receivers in IP data packets are encoded with a catenated encoder using, for example, a Reed-Solomon encoder or a convolutional encoder or a cyclic redundancy check (CRC) which generates CRC bits. Pre-processor 1 also generates additional control and status data such as the length, the periodicity and the sequence number of data units for each service, the time marker for transmission time of each data unit, and so on. Encoded payload data for mobile receivers and additional control and status data are formatted in ATSC-like transport stream (TS) data packets with a packet identifier specified for mobile data at the end of pre-processing.

Markers in TS data packets with data for stationary receivers are modified by a packet timing and program clock reference (PCR) adjustment unit 6. Particularly, packet timing and PCR adjustment unit 6 performs packet timing and PCR adjustment taking into account the insertion of TS data packets with data for mobile receivers (i.e., ATSC-M/H data packets) into the transport stream of TS data packets including data for stationary receivers (i.e., normal ATSC data packets) using a consecutively positioned packet multiplexer 7.

In the post-processor $4_1, 4_2, \ldots, 4_i, \ldots, 4_n$ at each remote positioned transmitter $5_1, 5_2, \ldots, 5_i, \ldots, 5_n$, scrambling, interleaving and channel encoding of the ATSC-like transport stream are performed. Each post-processor $4_1, 4_2, \ldots, 4_i, \ldots, 4_n$ is followed by a synchronization multiplexer $8_1, 8_2, \ldots, 8_i, \ldots, 8_n$ for inserting synchronizing data (e.g., data field sync and data segment sync) in the transport data stream, a pilot inserter $9_1, 9_2, \ldots, 9_i, \ldots, 9_n$ for inserting pilot symbols in the transport data stream, a pre-equalizer $10_1, 10_2, \ldots, 10_i, \ldots, 10_n$, an 8-VSB modulator $11_1, 11_2, \ldots, 11_i, \ldots, 11_n$, an RF-up-converter $12_1, 12_2, \ldots, 12_i, \ldots, 12_n$ for RF signal processing and a transmitter antenna $13_1, 13_2, \ldots, 13_i, \ldots, 13_n$.

For post-processing of the data packets to be transmitted, each transmitter at the transmitter site needs some further information determined in the pre-processing stage. To synchronize the segment and frame structure of the transport data stream between each transmitter and each receiver, segment and frame synchronization data are inserted by a synchronization multiplexer at the transmitter site at particular positions in the data stream. This is determined in the pre-processing stage at the head-end.

As described in U.S. patent application Ser. No. 12/024,238, incorporated herein in its entirety, a VSB frame initialization packet (VFIP) is transmitted once every 20 VSB Frames from the head-end to each transmitter to signal the start of a new VSB super frame in an ATSC data stream. Upon reception of a VFIP in a last data slot of a data field, the exciter is signaled to start a new VSB super frame and a new VSB data field after the last bit of VFIP is received. It would be advantageous to increase the effectiveness of the data transmission between the head-end and each transmitter and reduce any delay in the post-processing due to the delay in the arrival of a VFIP that may be caused by each transmitter.

BRIEF DESCRIPTION OF THE INVENTION

One aspect of the present invention provides a method and a system for signaling the start of each VSB data field in an ATSC data stream to each exciter at the transmitter site without any further loss of data rate and delay in post-processing.

Figure 2:
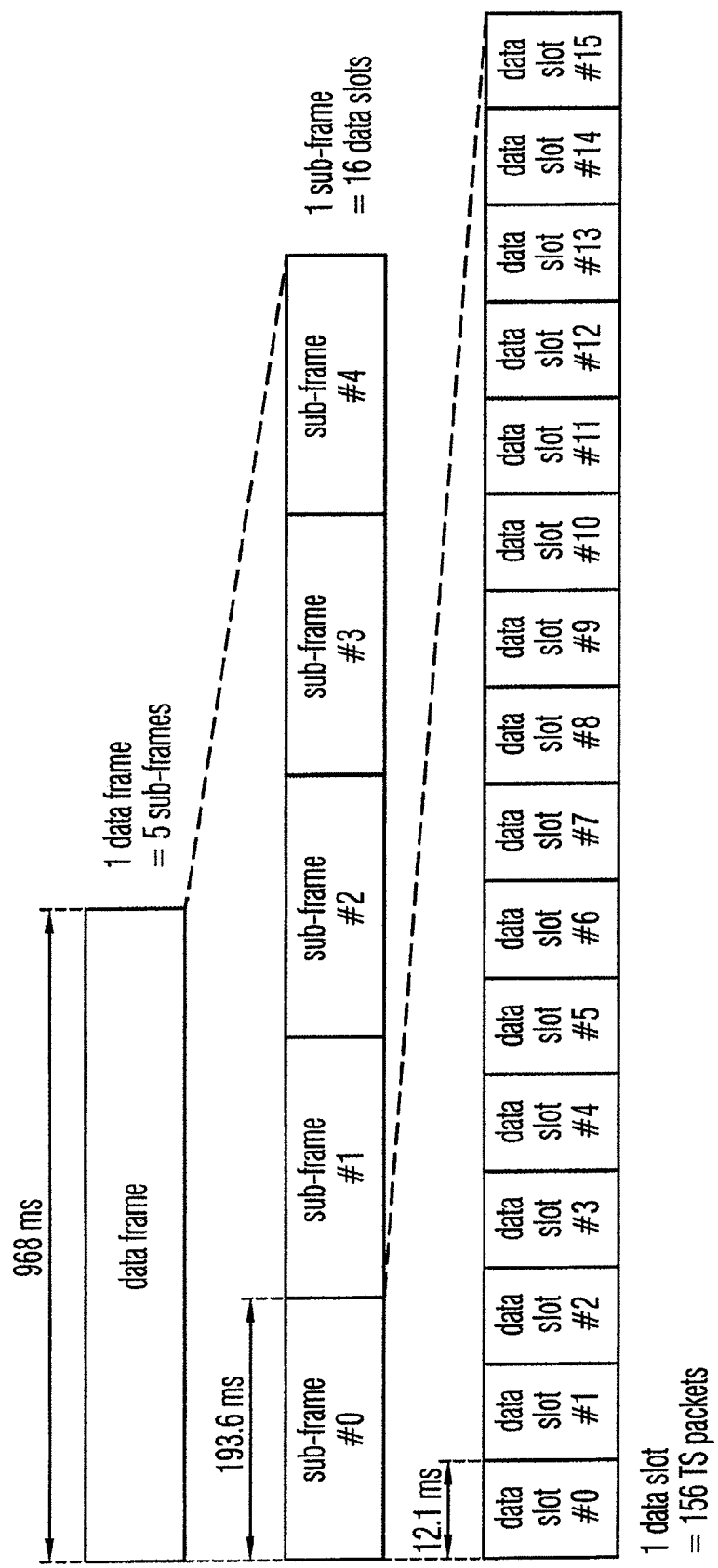

In an ATSC transmission system, between several transmitters and at least one receiver, a data stream of consecutively transmitted data frames having, for example, 5 subframes each, where each subframe contains 156 data packets, and each data packet has 188 bytes, is generated corresponding to FIG. 2. In a so-called first data packet, only digital data for stationary receivers are transferred, whereas so-called second data packets contain only data for mobile receivers. The second data packets are organized in ATSC-M/H groups (Advanced Television Systems Committee Mobile/Handheld groups) including 118 consecutively transmitted data packets in a data slot. These data slots contain 118 data packets with data for mobile receivers and 38 data packets with data for stationary receivers, or contain 156 data packets with data for stationary receivers only.

A multiplexer in the head-end generates a first data stream having first and second packets and each transmitter transmits a second data stream having consecutively arranged ATSC-like VSB data fields. For a correct synchronized mapping of the first and second data packets in the first data stream to the second data stream containing the consecutively transmitted ATSC-like VSB data fields, signaling between the head-end and each transmitter has to be performed.

To provide signaling to the exciter at each transmitter as to whether a transmitted data packet belongs to an ATSC-M/H group, preferably each data packet has a packet identifier identifying the data packet as a first data packet which is not a member of a ATSC-M/H group or as a second data packet which is a member of a ATSC-M/H group.

The multiplexer, which generates the first data stream with first and second data packets at the head-end, preferably inserts signaling information indicating, in which data slot and in which sub-frame of an ATSC-M/H data frame in the first data stream the respective ATSC-M/H group is transferred, in specific placeholders in second data packets at the start of the respective ATSC-M/H group. This is done to signal the exciter at each transmitter with the correct time-alignment of each ATSC-M/H group to a corresponding VSB data field in the second data stream transmitted from each transmitter of the ATSC-M/H transmission system. These placeholders are specific dummy bytes in the data packets, especially 13 dummy bytes in the first two data packets, in an ATSC-M/H group, which do not have any meaning in the transmission channel between the head-end and each transmitter and thus can be used for inband signaling information. Advantageously, this does not dissipate additional bandwidth of the transmission channel.

Each transmitter preferably extracts this signaling information from each placeholder in the received first data stream and in case of an identified ATSC-M/H group a synchronizing information (i.e., a data field sync) is inserted to a specific data packet in a data slot transferring the ATSC-M/H group, i.e., the $38^{th}$ data packet in a data slot transferring the ATSC-M/H group.

In case of signaling information extracted from placeholders in a data slot received at the start of a data frame, the $38^{th}$ data packet in the ATSC-M/H group with the synchronizing information (i.e., a data field sync) is mapped preferably to the data packet transmitted at the start of a odd-numbered VSB data field in the second data stream according to the ATSC standard. The data packets in the surrounding of the $38^{th}$ data packet of the ATSC-M/H group are consequently mapped to the data packets surrounding the data packet transmitted at the start of the odd-numbered VSB data field in the second data stream.

In case of signaling information extracted from placeholders in a data slot received at an even-numbered position of a data frame, the synchronizing information inserted in the $38^{th}$ data packet in the ATSC-M/H group is preferably mapped to a data packet transmitted at the start of a VSB data field in the second data stream according to the ATSC standard. The data packets surrounding the $38^{th}$ data packet of the ATSC-M/H group are consequently mapped to the data packets surrounding the firstly transmitted data packet of the new VSB data field in the second data stream.

In case of signaling information extracted from placeholders in a data slot received at an odd-numbered position of a data frame, the synchronizing information inserted in the $38^{th}$ data packet in the ATSC-M/H group is preferably mapped to the $157^{th}$ transmitted data packet of a VSB data field in the second data stream according to the ATSC-M/H standard. The data packets surrounding the $38^{th}$ data packet of the M/H group are consequently mapped to the data packets surrounding the $157^{th}$ transmitted data packet of the new VSB data field in the second data stream.

The mapping of the data slots containing only first data packets between two ATSC-M/H groups to the VSB data fields in the second data stream is preferably oriented to the mapping of the ATSC-M/H groups to the VSB data fields in the second data stream. Thus the $38^{th}$ data packet in a data slot containing only first data packets, which is received in an even-numbered position of a data frame, contains a frame synchronizing information and is mapped to the data packet at the start of a VSB data field in the second data stream. The first data packets surrounding these $38^{th}$ data packets are consequently mapped to the data packets surrounding the data packet transmitted at the start of the VSB data field in the second data stream. The $38^{th}$ data packet in a data slot containing only first data packets, which is received in an odd-numbered position of a data frame, is mapped to the $157^{th}$ transmitted data packet of a VSB data field in the second data stream. The first data packets surrounding these $38^{th}$ data packets are consequently mapped to the data packets surrounding the $157^{th}$ transmitted data packet of the VSB data field in the second data stream.

To continuously establish and maintain such a mapping structure—mapping of two data slots of the first data stream into one VSB data field of the second data stream, whereby the $38^{th}$ data packet of a data slot in an even-numbered position in the data frame of the first data stream is mapped to the data packet transmitted at the start of the VSB data field and the $38^{th}$ data packet of a data slot in an odd-numbered position in the data frame of the first data stream is mapped to the $157^{th}$ transmitted data packet of the VSB data field—a loss of one or more first or second data packets in the first data stream has to be prevented. In case first or second data packets are lost, preferably the following measures are performed:

Each second data packet has a continuity-counter in its packet header, which is incremented from the second data packet at the start of the ATSC-M/H group to the second data packet at the end of the ATSC-M/H group, thus enabling the identifying of a second data packet lost in the studio-transmitter-link (STL) and refilling of the ATSC-M/H group with a dummy second data packet in case of a lost second data packet. The loss of a first data packet in the STL can be identified by comparing the counted number of received first data packets between two received ATSC-M/H groups with the integer multiple of 156 data packets (i.e., the number of data packets in a data slot) plus (optionally) 38 data packets (i.e., the number of first data packets in a data slot with 118 second data packets) and can be corrected by refilling a number of dummy data packets corresponding the identified number of lost first data packets in the data stream.

The signaling information transferred in specific dummy bytes of the data packets, especially in 13 dummy bytes of the first two data packets of an ATSC-M/H group contains following exemplary information created at the head-end and used only at the transmitters:

the time point of synchronized transmission of the first bits of each ATSC-M/H group of the second data stream in each transmitter in the ATSC-M/H transmission system working as single frequency network is determined at the frame formatter at the head-end and has to be transferred to the exciters and information indicating an second operation mode, in which only data for stationary receivers are transmitted, after a first operation mode, in which both data for stationary receivers and both data for mobile receivers are transmitted.

In a case where a specific number of data frames of the first data stream are received—for example 10 data frames—without any identified second data packets, each receiver is preferably switched to the second operation mode in which only data for stationary receivers are transmitted. Thus no further additional dummy data packets have to be inserted in the second data stream for establishing and maintaining the typical mapping structure of ATSC-M/H groups in the VSB data fields of the second data stream.

For security reasons, the signaling information is preferably decoded with a cyclic-redundancy-check (CRC). The CRC-sum of the signaling information is also transferred in the dummy bytes of the first two data packets of an ATSC-M/H group. The received signaling information is checked with the CRC-sum for correctness in each transmitter. In case of correctly transmitted ATSC-M/H groups, the synchronizing information are inserted in the $38^{th}$ data packets of each data slot and the mapping is performed.

After extracting the signaling information from the unreserved dummy bytes in the first two data packets in each ATSC-M/H group, a preselected value is preferably inserted to each dummy byte by each transmitter.

In another aspect of the present invention, a system for generating an inband signal is provided including a pre-processor and post-processor. The pre-processor receives transport stream packets, replaces dummy bytes of one or more of the transport stream packets with signaling data, and transmits transport stream packets including the signaling data over a communications link. The post-processor is in communication with the pre-processor through the communications link and receives the transport stream packets including the signaling data, decodes the signaling data, and identifies at least one of a location of a mobile/handheld group, a subframe of the mobile/handheld group, and a slot number of the mobile/handheld group, based on the signaling data.

In yet another aspect of the present invention, a method is provided for carrying signaling information including receiving, by a pre-processor, transport stream packets, replacing dummy bytes of one or more of the transport stream packets with signaling data. The transport stream packets including the signaling data are, in turn, transmitted over a communications link and received by a post-processor. The signaling data is decoded and at least one of a location of a mobile/handheld group, a subframe of the mobile/handheld group, and a slot number of the mobile/handheld group are identified, based on the signaling data.

In yet another embodiment, a method is provided which cause a pre-processor, to generate an inband signal, including receiving transport stream packets, replacing dummy bytes of one or more of the transport stream packets with signaling data. The method further provides transmitting the transport stream packets including the signaling data over a communications link to a post-processor which receives the transport stream packets including the signaling data, decodes the signaling data, and identifies at least one of a location of a mobile/handheld group, a subframe of the mobile/handheld group, and a slot number of the mobile/handheld group, based on the signaling data.

In a further embodiment, a method is provided for causing a post-processor to process an inband signal including receiving, from a communications link, transport stream packets including signaling data and decoding the signaling data. At least one of a location of a mobile/handheld group, a subframe of the mobile/handheld group, and a slot number of the mobile/handheld group is identified based on the signaling data, where the transport stream packets including signaling data is generated by a pre-processor. The pre-processor receives transport stream packets, replace dummy bytes of one or more of the transport stream packets with the signaling data, and transmits the transport stream packets including the signaling data onto a communications link.

Computer-readable medium containing instructions for causing a computer system to perform the methods described herein are also provided.

The features and advantages of the present invention will become more apparent from the detailed description set forth below when taken in conjunction with the following drawings.

Figures 3, 4:
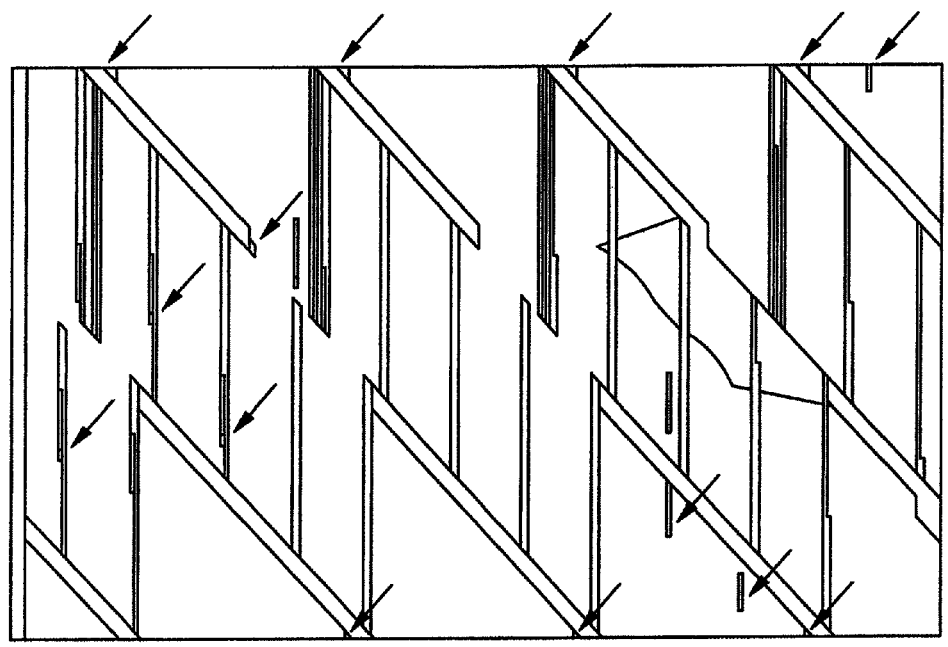
Figure 5:
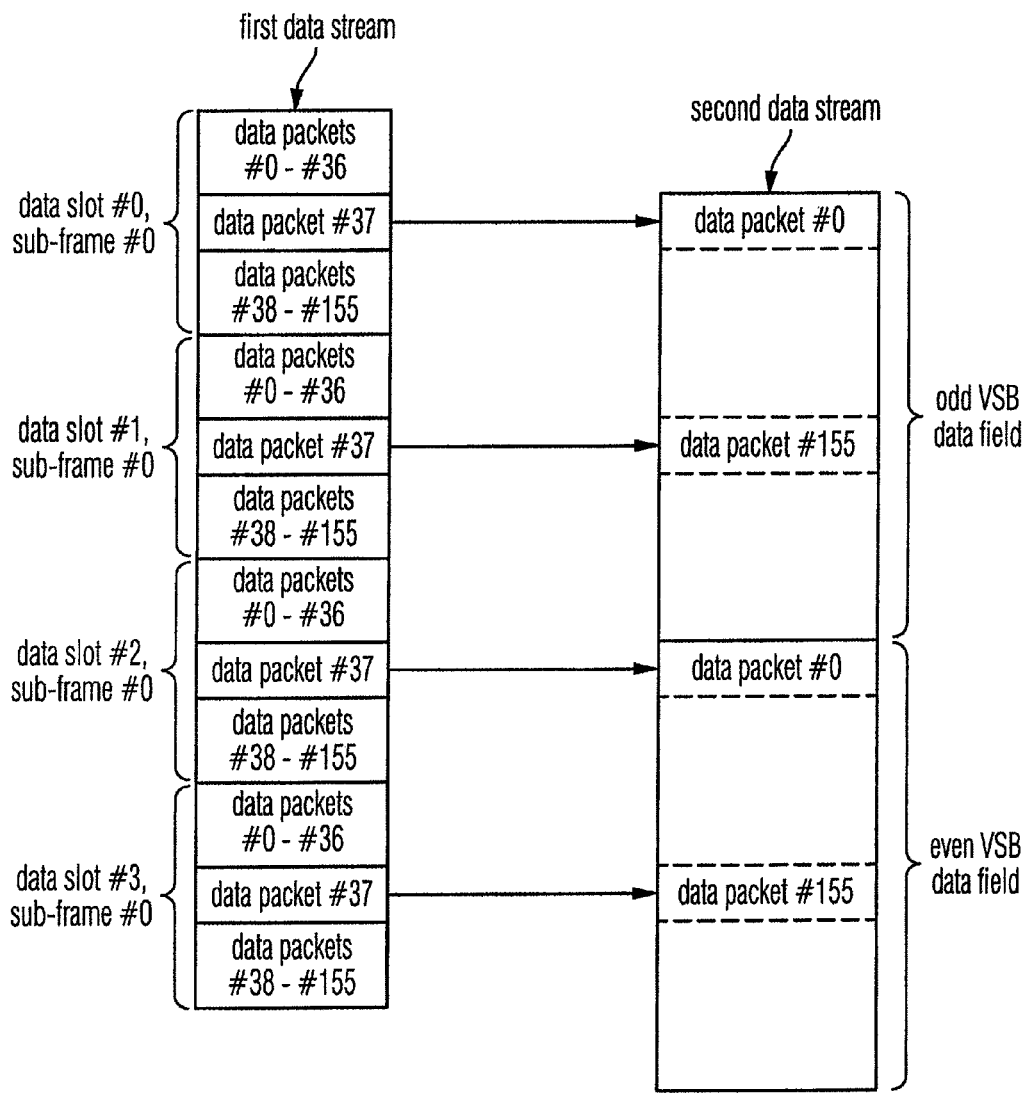
Figure 6:
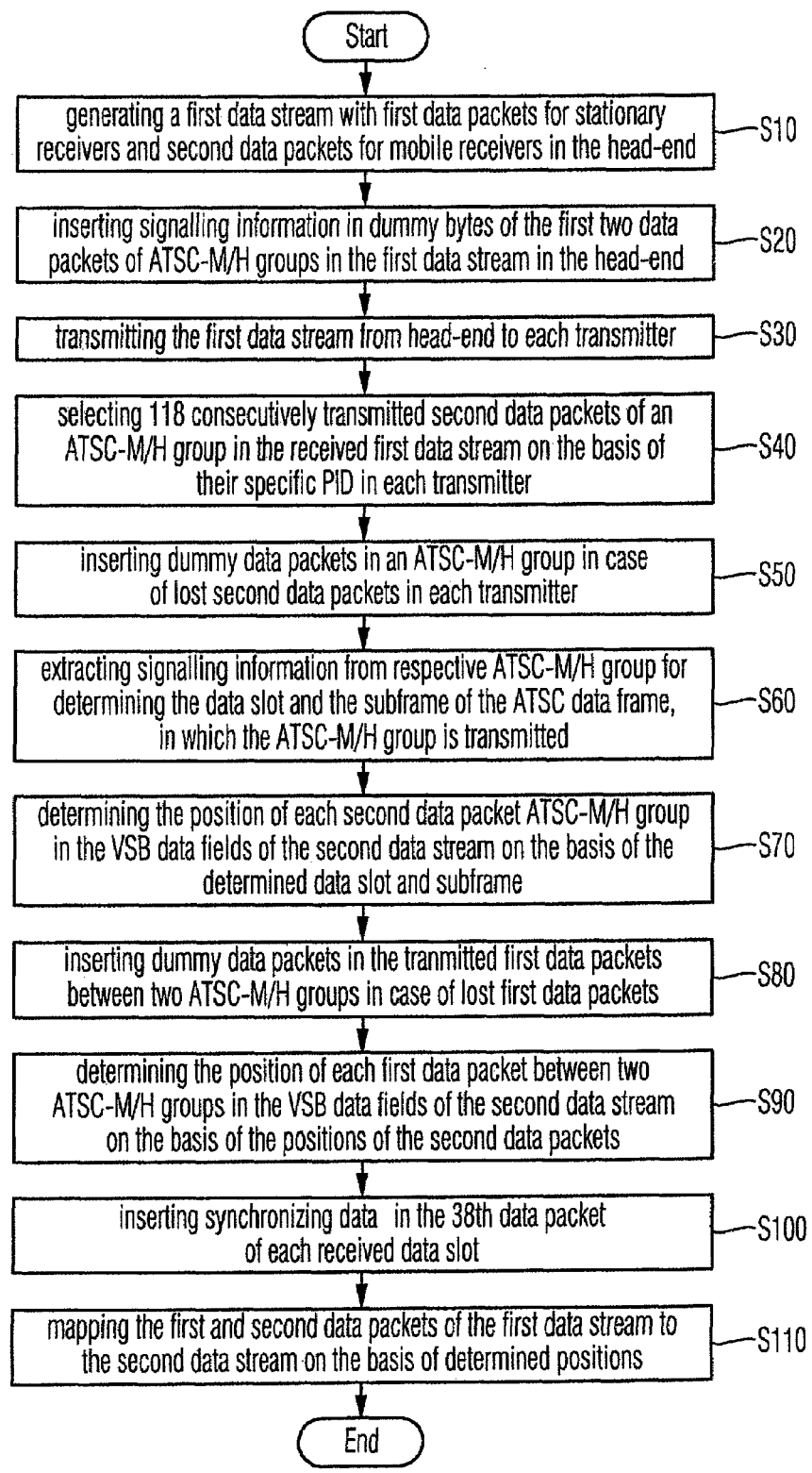

FIG. 1 is a block diagram of an ATSC-M/H transmission system with pre- and post-processing, FIG. 2 is a data structure of an ATSC-M/H data frame, FIG. 3 is a data structure of an ATSC-M/H group, FIG. 4 is a data structure of the first two data packets of an ATSC-M/H group, FIG. 5 is a data structure of an embodiment showing a synchronized mapping between first and second data stream, and FIG. 6 is a flowchart of an embodiment of a process for providing synchronized mapping of data packets for mobile receivers in an ATSC-M/H data stream.

DETAILED DESCRIPTION

FIG. 6, depicts a flowchart of an exemplary process for providing synchronized mapping of data packets for mobile receivers in an ATSC-M/H data stream in accordance with one aspect of the present invention. With reference to FIGS. 1 and 6, initially, in step S10, a first transport data stream containing first data packets with digital MPEG-encoded video data for stationary TV receivers and second data packets with digital MPEG-encoded video data for mobile TV receivers are generated by a packet multiplexer 7 in the head-end 2. The source-encoding of the digital video data is performed in an MPEG4-encoder (not shown). Typically, the source-encoding is performed according to the MPEG4-H.264 standard for the video data and according to the MPEG4-AAC-HE standard for the respective audio data.

After the sequencing of the first and second data packets in the first data stream, in step S20, the packet multiplexer 7 inserts signaling information in specific dummy bytes of the first two data packets of each ATSC-M/H group.

FIG. 3 is a data structure of an ATSC-M/H group and FIG. 4 is a data structure of the first two data packets of an ATSC-M/H group. With reference to both FIGS. 3 and 4, according to the ATSC-M/H standard, an ATSC-M/H group with a data structure corresponding to FIG. 3 is created in the pre-processor 1 in the ATSC-M/H-channel of the head-end 2. In total, 45 dummy bytes are placed in the data packets of an ATSC-M/H group for making the size of the ATSC-M/H group divisible by 2, 3 or 4 in the transmission between transmitters and receivers. Particularly, the dummy bytes in the first two data packets include 8 dummy bytes in the $1^{st}$ data packet and 5 dummy bytes in the $2^{nd}$ data packet characterized by the number "2" in FIG. 4 and indicated by an arrow in the data structure of an ATSC-M/H group in FIG. 3. For the transmission between transmitters and receivers, these dummy bytes preferably have a fixed pre-selected value e.g. 0xAF. In the transmission channel between the head-end and each transmitter, the dummy bytes have no meaning and thus can serve for transferring inband signaling information between head-end and each transmitter.

The first 12 dummy bytes transfer signaling information and the $13^{th}$ dummy byte transfers the cycle-redundancy-check-sum over the signaling information for security reason.

The signaling information transferred in the dummy bytes of the first two data packets of an ATSC-M/H group includes the following data:

the data slot number and the sub-frame number, in which the respective ATSC-M/H group is transferred in a data frame of the first data stream, the time point of synchronized transmission for the first bits of the $38^{th}$ data packet in an ATSC-M/H group in each exciter as absolute or referenced GPS time, the control information for switching each exciter from a first operation mode, in which data for stationary and mobile receivers are transmitted, to a second operation mode, in which only data for stationary receivers are transmitted, the number of ATSC-M/H groups in the current ATSC-M/H data frame, the identifier for the second data packet at the start of an ATSC-M/H group, and the identifier for the first ATSC-M/H group in an ATSC data frame and the packet multiplexer 7 inserts in the header of each second data packet in a first mode a fixed packet identifier (PID) for each ATSC-M/H data packet. In a second mode the packet multiplexer 7 selects a PID for each ATSC-M/H data packet from a set of preselected packet identifiers which is not already used in a first data packet for stationary receivers.

The generated and modified first data stream is transmitted from the head-end 2 to each transmitter $5_1, 5_2, \ldots, 5_i, \ldots, 5_n$ over each a studio-transmitter-link (STL) $3_1, 3_2, \ldots, 3_i, \ldots, 3_n$, as shown in step S30.

A respective post-processor $4_1, 4_2, \ldots, 4_i, \ldots, 4_n$ in each transmitter $5_1, 5_2, \ldots, 5_i, \ldots, 5_n$ identifies each second data packet in the received first data stream based on the packet identifier (PID) in the header of each received data packet. The respective post-processor $4_1, 4_2, \ldots, 4_i, \ldots, 4_n$ is able to detect a ATSC-M/H-specific PID in the second mode by identifying 118 consecutively transmitted ATSC-M/H group data packets. An ATSC-M/H group containing 118 consecutively transmitted second data packets (i.e., ATSC-M/H data packets) is correspondingly identified in the received first data stream by a respective transmitter $5_1, 5_2, \ldots, 5_i, \ldots, 5_n$ in step S40.

If a group of less than 118 consecutively transmitted second data packets is identified by the respective post-processor $4_1, 4_2, \ldots, 4_i, \ldots, 4_n$ in each transmitter $5_1, 5_2, \ldots, 5_i, \ldots, 5_n$ in step S40, the missing number of second data packets is lost in the respective studio-transmitter-link (STL) $3_1, 3_2, \ldots, 3_i, \ldots, 3_n$. The respective post-processor $4_1, 4_2, \ldots, 4_i, \ldots, 4_n$ in each transmitter $5_1, 5_2, \ldots, 5_i, \ldots, 5_n$ is able to detect the lost second data packets by checking the continuity-number in the header of all received second data packets, which is incremented from the $1^{st}$ ATSC-M/H data packet at the start to the $118^{th}$ ATSC-M/H data packet at the end of an ATSC-M/H group. In case of a missing continuity-number and thus a lost second data packet, in step S50, a dummy data packet without any relevant data is inserted in the respective ATSC-M/H group of the first data stream by the respective post-processor $4_1, 4_2, \ldots, 4_i, \ldots, 4_n$ in each transmitter $5_1, 5_2, \ldots, 5_i, \ldots, 5_n$.

If any second data packet is not identified by the respective post-processor $4_1, 4_2, \ldots, 4_i, \ldots, 4_n$ in each transmitter $5_1, 5_2, \ldots, 5_i, \ldots, 5_n$ for more than a specific pre-selected number of received ATSC data frames—for example for more than 10 ATSC data frames—the respective post-processor $4_1, 4_2, \ldots, 4_i, \ldots, 4_n$ in each transmitter $5_1, 5_2, \ldots, 5_i, \ldots, 5_n$ is switched to a second operation mode. In this mode only ATSC data frames for stationary TV receivers are transmitted and thus no dummy data packets are inserted in the first data stream in a case where data packets have been lost. If the signaling information in the actual received ATSC-M/H group that signals the number of ATSC-M/H groups in the current ATSC-M/H data frame reports no further ATSC-M/H groups in the current ATSC-M/H data frame, the respective transmitter $5_1, 5_2, \ldots, 5_i, \ldots, 5_n$ is also switched to the second operation mode dealing only with data for stationary TV receivers.

In the case of an identified ATSC-M/H group, the respective post-processor $4_1, 4_2, \ldots, 4_i, \ldots, 4_n$ in each transmitter $5_1, 5_2, \ldots, 5_i, \ldots, 5_n$ extracts, in step S60, the data slot number and the sub-frame number in which the identified ATSC-M/H group is transmitted in the current received ATSC data frame of the first data stream. The number of data slots resp. of sub-frames is the position of the data slot resp. of the sub-frame in the ATSC-M/H data frame incremented from the data slot resp. from the first transmitted sub-frame at the start of the respective ATSC-M/H data frame.

Before extracting the data slot number and the sub-frame number from signaling information of the received ATSC-M/H group the respective post-processor $4_1, 4_2, \ldots, 4_i, \ldots, 4_n$ in each transmitter $5_1, 5_2, \ldots, 5_i, \ldots, 5_n$ the device has to decode the received 12 bytes of signaling information by calculating the cyclic-redundancy-check-sum of the received 12 bytes signaling information and to compare the calculated CRC-sum with the reference CRC-sum in the $13^{th}$ byte of signaling information. Only in case of a correct received and checked signaling information a valid selection of the data slot number and of the sub-frame number in the actual received ATSC-M/H group can be performed by means of the respective post-processor $4_1, 4_2, \ldots, 4_i, \ldots, 4_n$ in each transmitter $5_1, 5_2, \ldots, 5_i, \ldots, 5_n$ and a switching of the exciters of each transmitter $5_1, 5_2, \ldots, 5_i, \ldots, 5_n$ from a second operation mode to a first operation mode enabling the transmission of first and second data packets is performed.

On the basis of the extracted data slot number and the extracted sub-frame number of the actual received ATSC-M/H group, the position of each second data packet of the received ATSC-M/H group in a VSB data field of the second data stream transmitted from each transmitter $5_1, 5_2, \ldots, 5_i, \ldots, 5_n$ to each receiver is determined in step S70 by the respective post-processor $4_1, 4_2, \ldots, 4_i, \ldots, 4_n$ in each transmitter $5_1, 5_2, \ldots, 5_i, \ldots, 5_n$. The mapping of the extracted data slot number and the extracted sub-frame number of the actual received ATSC-M/H to the position in a VSB data field corresponds to following assignment as shown in FIG. 5:

the $38^{th}$ data packet (#37) in the ATSC-M/H group received in the first data slot of the first sub-frame in the actual received ATSC-M/H data frame is mapped to the first position for a data packet in a VSB data field in an odd-numbered position in the second data stream, the $38^{th}$ data packet in the ATSC-M/H group received in an even-numbered position in the actual received ATSC-M/H data frame is mapped to the first position for a data packet in a VSB data field in the second data stream, and the $38^{th}$ data packet in the ATSC-M/H group received in an odd-numbered position in the actual received ATSC-M/H data frame is mapped to the $157^{th}$ position for a data packet in a VSB data field in the second data stream.

The 37 second data packets (#0-#36) transferred at the start of each ATSC-M/H group and the 118 second data packets (#38-#155) transferred at the end of each ATSC-M/H group are correspondingly positioned in the surrounding positions for data packets in the VSB data fields in the second data stream.

In step S80, the received first data packets with data for stationary TV receivers between two identified ATSC-M/H groups are identified in the received first data stream and counted. The counted number of received first data packets between two identified ATSC-M/H groups has to be an integer multiple of 156 data packets (i.e., the number of first data packets in a data slot containing only first data packets) plus, optionally, 38 data packets (i.e., the number of first data packets in a data slot with first and second data packets)—in the case of a correct transmission. If one or more first data packets are lost in the respective studio-transmitter-link (STL) $3_1, 3_2, \ldots, 3_i, \ldots, 3_n$, the corresponding number of dummy data packets has to be inserted in the VSB data fields between the VSB data fields transferring each an ATSC-M/H group to continuously establish and maintain the mapping data structure.

In step S90, the position of each first data packet received in the first data stream is determined by the respective post-processor $4_1, 4_2, \ldots, 4_i, \ldots, 4_n$ in each transmitter $5_1, 5_2, \ldots, 5_i, \ldots, 5_n$. This is accomplished by calculating a number of VSB data fields reserved for transferring first data packets between the two VSB data fields each transferring second data packets of an ATSC-M/H group. The position of each consecutively transmitted first data packet in one of the calculated VSB data fields is determined on the basis of the calculated number of VSB data fields reserved for first data packets.

In step S100, the respective post-processor $4_1, 4_2, \ldots, 4_i, \ldots, 4_n$ in each transmitter $5_1, 5_2, \ldots, 5_i, \ldots 5_n$ inserts synchronization information to each $38^{th}$ second data packet (i.e., to each $38^{th}$ ATSC-M/H data packet) in each ATSC-M/H group corresponding to the ATSC-M/H standard. This synchronization information is a data field sync for synchronizing the start and the center of a VSB data field containing second data packets corresponding to the ATSC-M/H standard. The synchronization of VSB data fields containing first data packets is not defined by a standard. Thus the exciters in each transmitter $5_1, 5_2, \ldots, 5_i, \ldots, 5_n$ are allowed to insert a specific synchronizing information in an arbitrary position of a VSB data field with first data packets transferring data for stationary TV receivers.

In step S110, the second data stream is generated by the respective post-processor $4_1, 4_2, \ldots, 4_i, \ldots, 4_n$ in each transmitter $5_1, 5_2, \ldots, 5_i, \ldots, 5_n$ by mapping the first and second data packets received in the first data stream to the positions in each consecutively transmitted VSB data field of the second data stream, which are determined in steps S70 and S90.

After the mapping procedure, the dummy bytes in the first two data packets of each ATSC-M/H group in the second data stream are rewritten with a pre-selected value, preferably with the value 0xAF, for a correct detection of these dummy bytes by each receiver.

Each VSB data field in the second data stream is synchronously transmitted by the antenna $13_1, 13_2, \ldots, 13_i, \ldots, 13_n$ of each transmitter $5_1, 5_2, \ldots, 5_i, \ldots, 5_n$ at a synchronized time point. The synchronized time point is determined in the head-end 2 and transmitted to each transmitter $5_1, 5_2, \ldots, 5_i, \ldots, 5_n$ for ATSC-M/H data as part of the signaling information in the first two data packets of an ATSC-M/H group.

The scope of the invention is not limited by the features of the claimed and described subject matters. Further signaling information between the head-end and each transmitter of the single frequency network, which are not described in the patent application, for example, are inside the scope and spirit of the present invention.

The specification and drawings are accordingly to be regarded in an illustrative rather than in a restrictive sense. It will, however, be evident that various modifications and changes may be made thereto, in a computer program product or software, hardware or any combination thereof, without departing from the broader spirit and scope of the present invention.

Software embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

The invention claimed is:

1. A method for mapping data packets of a first data stream into data fields of a second data stream at several transmitters, comprising:

generating a first data stream with first data packets containing data associated with stationary receivers and second data packets containing data associated with mobile receivers in a head-end, whereby second data packets at the start of a group of consecutively transmitted second data packets contain specific dummy bytes into which signaling information is filled;

transmitting said first data stream from said head-end to each of said transmitters;

extracting, by each transmitter, said signaling information from said second data packets indicating in which data slot and in which data sub-frame of a received data frame said second data packet is transferred;

inserting, by each transmitter, synchronization data in a specific data packet in each data slot containing second data packets; and mapping said first and second data packets consecutively into said second data stream, wherein a number of received second data packets of an ATSC-M/H group is checked for completeness using a continuity counter in a header of each second data packet, and wherein a number of second data packets containing a dummy data packet is inserted in said data slot corresponding to the number of lost second data packets in an ATSC-M/H group of said data slot.

2. The method according to claim 1,
wherein said specific data packet with synchronization data at the start of a received data frame is positioned at the start of an odd-numbered data field in said second data stream.

3. The method according to claim 1,
wherein said specific data packet with synchronization data in a data slot at an even-numbered position in a data frame is mapped to the first data packet of a data field in said second data stream.

4. The method according to claim 1,
wherein said specific data packet with synchronizing data in a data slot at an odd-numbered position in a received data frame is mapped to the $157^{th}$ data packet of a data field in said second data stream.

5. The method according to claim 1,
wherein said first data stream comprises ATSC data frames and said second data stream includes VSB data fields and an ATSC-M/H group including 118 consecutively positioned second data packets in a data slot, the second data packets having data associated with mobile receivers.

6. The method according to claim 1,
wherein before extracting said signaling information from said second data packet identifying, by each transmitter, the first data packets and second data packets based on the corresponding packet identifier.

7. The method according to claim 1,
wherein after extracting said signaling information, decoding said signaling information using a cycle redundancy check information transmitted at the end of said signaling information to determine a correct transmission of said signaling information.

8. The method according to claim 1,
wherein the specific data packet in each data slot in which synchronizing information is inserted is the $38^{th}$ data packet of the data slot.

9. The method according to claim 1,
wherein the number of received first data packets of a data slot is checked for completeness, and
wherein a number of first data packets containing dummy data packets is inserted in said data slot corresponding to the number of lost first data packets in said data slot.

10. The method according to any of claim 1,
wherein said signaling information further includes an ATSC system time associated with each transmitter.

11. The method according to claim 1,
wherein said signaling information contains an information for switching each transmitter from a first operation mode in which data for mobile and stationary receivers are transmitted to a second operation mode in which only data for stationary receivers are transmitted.

12. The method according to claim 11,
wherein after receiving a specific number of data frames of the first data stream without any identified second data packets, each transmitter is switched to said second operation mode.

13. The method according to claim 1,
wherein each specific dummy byte with signaling data in the first two received second data packets are rewritten with a pre-selected value after extracting said signaling information.

14. A system for mapping data packets of a first data stream into data fields of a second data stream at several transmitters, comprising:

a head-end operable to generate a first data stream with first data packets containing data associated with stationary receivers and second data packets containing data associated with mobile receivers, whereby second data packets at the start of a group of consecutively transmitted second data packets contain specific dummy bytes into which signaling information is filled;
said head-end further operable to transmit said first data stream to each of said transmitters,
wherein each transmitter is operable to extract said signaling information from said second data packets indicating in which data slot and in which data sub-frame of a received data frame said second data packet is transferred, insert synchronization data in a specific data packet in each data slot containing second data packets, and map said first and second data packets consecutively into said second data stream,
wherein a number of received second data packets of an ATSC-M/H group is checked for completeness using a continuity counter in a header of each second data packet, and
wherein a number of second data packets containing a dummy data packet is inserted in said data slot corresponding to the number of lost second data packets in an ATSC-M/H group of said data slot.

15. The system according to claim 14,
wherein said specific data packet with synchronization data at the start of a received data frame is positioned at the start of an odd-numbered data field in said second data stream.

16. The system according to claim 14,
wherein said specific data packet with synchronization data in a data slot at an even-numbered position in a data frame is mapped to the first data packet of a data field in said second data stream.

17. The system according to claim 14,
wherein said specific data packet with synchronizing data in a data slot at an odd-numbered position in a received data frame is mapped to the $157^{th}$ data packet of a data field in said second data stream.

18. The system according to claim 14,
wherein said first data stream comprises ATSC data frames and said second data stream includes VSB data fields and an ATSC-M/H group including 118 consecutively positioned second data packets in a data slot, the second data packets having data associated with mobile receivers.

19. The system according to claim 14,
wherein before each transmitter extracts said signaling information from said second data packet identifying, the first data packets and second data packets based on the corresponding packet identifier.

20. The system according to claim 14, further comprising:
a decoder operable to decode said signaling information using a cycle redundancy check information transmitted at the end of said signaling information to determine a correct transmission of said signaling information.

21. The system according to claim 14,
wherein the specific data packet in each data slot in which synchronizing information is inserted is the $38^{th}$ data packet of the data slot.

22. The system according to claim 14,
wherein the number of received first data packets of a data slot is checked for completeness, and
wherein a number of first data packets containing dummy data packets is inserted in said data slot corresponding to the number of lost first data packets in said data slot.

23. The system according to any of claim 14,
wherein said signaling information further includes an ATSC system time associated with each transmitter.

24. The system according to claim 14,
wherein said signaling information contains an information for switching each transmitter from a first operation mode in which data for mobile and stationary receivers are transmitted to a second operation mode in which only data for stationary receivers are transmitted.

25. The system according to claim 24,
wherein after receiving a specific number of data frames of the first data stream without any identified second data packets, each transmitter is switched to said second operation mode.

26. The system according to claim 14,
wherein each specific dummy byte with signaling data in the first two received second data packets are rewritten with a pre-selected value after extracting said signaling information.

27. A non-transitory computer-readable medium having stored thereon sequences of instructions, the sequences of instructions including instructions which when executed by a computer system causes the computer system to perform:
generating a first data stream with first data packets containing data associated with stationary receivers and second data packets containing data associated with mobile receivers in a head-end, whereby second data packets at the start of a group of consecutively transmitted second data packets contain specific dummy bytes into which signaling information is filled;
transmitting said first data stream from said head-end to a plurality of transmitters;
extracting, by each transmitter, said signaling information from said second data packets indicating in which data slot and in which data sub-frame of a received data frame said second data packet is transferred;
inserting, by each transmitter, synchronization data in a specific data packet in each data slot containing second data packets; and
mapping said first and second data packets consecutively into a second data stream,
wherein a number of received second data packets of an ATSC-M/H group is checked for completeness using a continuity counter in a header of each second data packet, and
wherein a number of second data packets containing a dummy data packet is inserted in said data slot corresponding to the number of lost second data packets in an ATSC-M/H group of said data slot.

28. The non-transitory computer-readable medium according to claim 27,
wherein said specific data packet with synchronization data at the start of a received data frame is positioned at the start of an odd-numbered data field in said second data stream.

29. The non-transitory computer-readable medium according to claim 27,
wherein said specific data packet with synchronization data in a data slot at an even-numbered position in a data frame is mapped to the first data packet of a data field in said second data stream.

30. The non-transitory computer-readable medium according to claim 27,
wherein said specific data packet with synchronizing data in a data slot at an odd-numbered position in a received data frame is mapped to the $157^{th}$ data packet of a data field in said second data stream.

31. The non-transitory computer-readable medium according to claim 27,
wherein said first data stream comprises ATSC data frames and said second data stream includes VSB data fields and an ATSC-M/H group including 118 consecutively positioned second data packets in a data slot, the second data packets having data associated with mobile receivers.

32. The non-transitory computer-readable medium according to claim 27,
wherein before extracting said signaling information from said second data packet identifying, by each transmitter, the first data packets and second data packets based on the corresponding packet identifier.

33. The non-transitory computer-readable medium according to claim 27,
wherein after extracting said signaling information, decoding said signaling information using a cycle redundancy check information transmitted at the end of said signaling information to determine a correct transmission of said signaling information.

34. The non-transitory computer-readable medium according to claim 27,
wherein the specific data packet in each data slot in which synchronizing information is inserted is the $38^{th}$ data packet of the data slot.

35. The non-transitory computer-readable medium according to claim 27,
wherein the number of received first data packets of a data slot is checked for completeness, and
wherein a number of first data packets containing dummy data packets is inserted in said data slot corresponding to the number of lost first data packets in said data slot.

36. The non-transitory computer-readable medium according to any of claim 27,
wherein said signaling information further includes an ATSC system time associated with each transmitter.

37. The non-transitory computer-readable medium according to claim 27,
wherein said signaling information contains an information for switching each transmitter from a first operation mode in which data for mobile and stationary receivers are transmitted to a second operation mode in which only data for stationary receivers are transmitted.

38. The non-transitory computer-readable medium according to claim 37,
wherein after receiving a specific number of data frames of the first data stream without any identified second data packets, each transmitter is switched to said second operation mode.

39. The non-transitory computer-readable medium according to claim 27,
wherein each specific dummy byte with signaling data in the first two received second data packets are rewritten with a pre-selected value after extracting said signaling information.

40. A system for generating an inband signal, comprising:
a pre-processor configured to receive a plurality of transport stream packets, replace a plurality of specific dummy bytes of one or more of the plurality of transport stream packets with signaling data, and transmit the plurality of transport stream packets including the signaling data over a communications link; and
a post-processor in communication with the pre-processor through the communications link, configured to receive the plurality of transport stream packets including the signaling data, decode the signaling data, and identify at least one of a location of a mobile/handheld group, a subframe of the mobile/handheld group, and a slot number of the mobile/handheld group, based on the signaling data, wherein a number of received transport stream packets of an ATSC-M/H group is checked for completeness using a continuity counter in a header of each transport stream packet, and wherein a number of transport stream packets containing a dummy data packet is inserted in a data slot corresponding to the number of lost transport stream packets in an ATSC-M/H group of said data slot.

41. The system of claim 40, wherein the post-processor is further configured to replace the signaling data with original values of the plurality of specific dummy bytes received by the pre-processor.

42. A method for using a mobile/handheld system to carry signaling information, comprising:

receiving, by a pre-processor, a plurality of transport stream packets;

replacing a plurality of specific dummy bytes of one or more of the plurality of transport stream packets with signaling data;

transmitting the plurality of transport stream packets including the signaling data over a communications link;

receiving, by a post-processor, the plurality of transport stream packets including the signaling data;

decoding the signaling data; and identifying at least one of a location of a mobile/handheld group, a subframe of the mobile/handheld group, and a slot number of the mobile/handheld group, based on the signaling data, wherein a number of received transport stream packets of an ATSC-M/H group is checked for completeness using a continuity counter in a header of each transport stream packet, and wherein a number of transport stream packets containing a dummy data packet is inserted in a data slot corresponding to the number of lost transport stream packets in an ATSC-M/H group of said data slot.

43. The method of claim 42, further comprising:

replacing, by the post-processor, the signaling data with original values of the plurality of specific dummy bytes obtained by the pre-processor.

44. A method for causing a pre-processor to generate an inband signal, comprising:

receiving a plurality of transport stream packets;

replacing a plurality of specific dummy bytes of one or more of the plurality of transport stream packets with signaling data;

transmitting the plurality of transport stream packets including the signaling data over a communications link to a post-processor configured to receive the plurality of transport stream packets including the signaling data;

decoding the signaling data; and identifying at least one of a location of a mobile/handheld group, a subframe of the mobile/handheld group, and a slot number of the mobile/handheld group, based on the signaling data, wherein a number of received transport stream packets of an ATSC-M/H group is checked for completeness using a continuity counter in a header of each transport stream packet, and wherein a number of transport stream packets containing a dummy data packet is inserted in a data slot corresponding to the number of lost transport stream packets in an ATSC-M/H group of said data slot.

45. A non-transitory computer-readable medium having stored thereon sequences of instructions, the sequences of instructions including instructions which when executed by a computer system causes the computer system to perform:

receiving a plurality of transport stream packets;

replacing a plurality of specific dummy bytes of one or more of the plurality of transport stream packets with signaling data;

transmitting the plurality of transport stream packets including the signaling data over a communications link to a post-processor configured to receive the plurality of transport stream packets including the signaling data;

decoding the signaling data; and identifying at least one of a location of a mobile/handheld group, a subframe of the mobile/handheld group, and a slot number of the mobile/handheld group, based on the signaling data, wherein a number of received transport stream packets of an ATSC-M/H group is checked for completeness using a continuity counter in a header of each transport stream packet, and wherein a number of transport stream packets containing a dummy data packet is inserted in a data slot corresponding to the number of lost transport stream packets in an ATSC-M/H group of said data slot.

46. A method for causing a post-processor to process an inband signal, comprising:

receiving, from a communications link, a plurality of transport stream packets including signaling data;

decoding the signaling data; and identifying at least one of a location of a mobile/handheld group, a subframe of the mobile/handheld group, and a slot number of the mobile/handheld group, based on the signaling data, wherein the plurality of transport stream packets including signaling data is generated by a pre-processor configured to receive a plurality of transport stream packets, replace a plurality of specific dummy bytes of one or more of the plurality of transport stream packets with the signaling data, and transmit the plurality of transport stream packets including the signaling data onto a communications link, wherein a number of received transport stream packets of an ATSC-M/H group is checked for completeness using a continuity counter in a header of each transport stream packet, and wherein a number of transport stream packets containing a dummy data packet is inserted in a data slot corresponding to the number of lost transport stream packets in an ATSC-M/H group of said data slot.

47. The method of claim 46, further comprising:

replacing the signaling data with original values of the plurality of specific dummy bytes.

48. A non-transitory computer-readable medium having stored thereon sequences of instructions, the sequences of instructions including instructions which when executed by a computer system causes the computer system to perform:

receiving, from a communications link, a plurality of transport stream packets including signaling data;

decoding the signaling data; and identifying at least one of a location of a mobile/handheld group, a subframe of the mobile/handheld group, and a slot number of the mobile/handheld group, based on the signaling data, wherein the plurality of transport stream packets including signaling data is generated by a pre-processor configured to receive a plurality of transport stream packets, replace a plurality of specific dummy bytes of one or more of the plurality of transport stream packets with the signaling data, and transmit the plurality of transport stream packets including the signaling data onto a communications link, wherein a number of received transport stream packets of an ATSC-M/H group is checked for completeness using a continuity counter in a header of each transport stream packet, and wherein a number of transport stream packets containing a dummy data packet is inserted in a data slot corresponding to the number of lost transport stream packets in an ATSC-M/H group of said data slot.

49. The non-transitory computer-readable medium of claim 48, having stored thereon instructions which cause the computer system to perform:
replacing the signaling data with original values of the plurality of specific dummy bytes obtained by the pre-processor.

50. A method for mapping data packets of a first data stream into data fields of a second data stream at several transmitters, comprising:
generating a first data stream with first data packets containing data associated with stationary receivers and second data packets containing data associated with mobile receivers in a head-end, whereby second data packets at the start of a group of consecutively transmitted second data packets contain specific dummy bytes into which signaling information is filled;
transmitting said first data stream from said head-end to each of said transmitters;
extracting, by each transmitter, said signaling information from said second data packets indicating in which data slot and in which data sub-frame of a received data frame said second data packet is transferred;
inserting, by each transmitter, synchronization data in a specific data packet in each data slot containing second data packets; and
mapping said first and second data packets consecutively into said second data stream,
wherein each specific dummy byte with signaling data in the first two received second data packets is rewritten with a pre-selected value after extracting said signaling information.

51. The method according to claim 50,
wherein said specific data packet with synchronization data at the start of a received data frame is positioned at the start of an odd-numbered data field in said second data stream.

52. The method according to claim 50,
wherein said specific data packet with synchronization data in a data slot at an even-numbered position in a data frame is mapped to the first data packet of a data field in said second data stream.

53. The method according to claim 50,
wherein said specific data packet with synchronizing data in a data slot at an odd-numbered position in a received data frame is mapped to the $157^{th}$ data packet of a data field in said second data stream.

54. The method according to claim 50,
wherein said first data stream comprises ATSC data frames and said second data stream includes VSB data fields and an ATSC-M/H group including 118 consecutively positioned second data packets in a data slot, the second data packets having data associated with mobile receivers.

55. The method according to claim 50,
wherein before extracting said signaling information from said second data packet identifying, by each transmitter, the first data packets and second data packets based on the corresponding packet identifier.

56. The method according to claim 50,
wherein after extracting said signaling information, decoding said signaling information using a cycle redundancy check information transmitted at the end of said signaling information to determine a correct transmission of said signaling information.

57. The method according to claim 50,
wherein the specific data packet in each data slot in which synchronizing information is inserted is the $38^{th}$ data packet of the data slot.

58. The method according to claim 50,
wherein a number of received second data packets of an ATSC-M/H group is checked for completeness using a continuity counter in a header of each second data packet, and
wherein a number of second data packets containing a dummy data packet is inserted in said data slot corresponding to the number of lost second data packets in an ATSC-M/H group of said data slot.

59. The method according to claim 50,
wherein the number of received first data packets of a data slot is checked for completeness, and
wherein a number of first data packets containing dummy data packets is inserted in said data slot corresponding to the number of lost first data packets in said data slot.

60. The method according to any of claim 50,
wherein said signaling information further includes an ATSC system time associated with each transmitter.

61. The method according to claim 50,
wherein said signaling information contains an information for switching each transmitter from a first operation mode in which data for mobile and stationary receivers are transmitted to a second operation mode in which only data for stationary receivers are transmitted.

62. The method according to claim 61,
wherein after receiving a specific number of data frames of the first data stream without any identified second data packets, each transmitter is switched to said second operation mode.

63. A system for mapping data packets of a first data stream into data fields of a second data stream at several transmitters, comprising:
a head-end operable to generate a first data stream with first data packets containing data associated with stationary receivers and second data packets containing data associated with mobile receivers, whereby second data packets at the start of a group of consecutively transmitted second data packets contain specific dummy bytes into which signaling information is filled;
said head-end further operable to transmit said first data stream to each of said transmitters,
wherein each transmitter is operable to extract said signaling information from said second data packets indicating in which data slot and in which data sub-frame of a received data frame said second data packet is transferred, insert synchronization data in a specific data packet in each data slot containing second data packets, and map said first and second data packets consecutively into said second data stream, and wherein each specific dummy byte with signaling data in the first two received second data packets is rewritten with a pre-selected value after extracting said signaling information.

64. The system according to claim 63, wherein said specific data packet with synchronization data at the start of a received data frame is positioned at the start of an odd-numbered data field in said second data stream.

65. The system according to claim 63, wherein said specific data packet with synchronization data in a data slot at an even-numbered position in a data frame is mapped to the first data packet of a data field in said second data stream.

66. The system according to claim 63, wherein said specific data packet with synchronizing data in a data slot at an odd-numbered position in a received data frame is mapped to the 157$^{th}$ data packet of a data field in said second data stream.

67. The system according to claim 63, wherein said first data stream comprises ATSC data frames and said second data stream includes VSB data fields and an ATSC-M/H group including 118 consecutively positioned second data packets in a data slot, the second data packets having data associated with mobile receivers.

68. The system according to claim 63, wherein before each transmitter extracts said signaling information from said second data packet identifying, the first data packets and second data packets based on the corresponding packet identifier.

69. The system according to claim 63, further comprising:
a decoder operable to decode said signaling information using a cycle redundancy check information transmitted at the end of said signaling information to determine a correct transmission of said signaling information.

70. The system according to claim 63, wherein the specific data packet in each data slot in which synchronizing information is inserted is the 38$^{th}$ data packet of the data slot.

71. The system according to claim 63, wherein a number of received second data packets of an ATSC-M/H group is checked for completeness using a continuity counter in a header of each second data packet, and
wherein a number of second data packets containing a dummy data packet is inserted in said data slot corresponding to the number of lost second data packets in an ATSC-M/H group of said data slot.

72. The system according to claim 63, wherein the number of received first data packets of a data slot is checked for completeness, and
wherein a number of first data packets containing dummy data packets is inserted in said data slot corresponding to the number of lost first data packets in said data slot.

73. The system according to any of claim 63, wherein said signaling information further includes an ATSC system time associated with each transmitter.

74. The system according to claim 63, wherein said signaling information contains an information for switching each transmitter from a first operation mode in which data for mobile and stationary receivers are transmitted to a second operation mode in which only data for stationary receivers are transmitted.

75. The system according to claim 74, wherein after receiving a specific number of data frames of the first data stream without any identified second data packets, each transmitter is switched to said second operation mode.

76. A non-transitory computer-readable medium having stored thereon sequences of instructions, the sequences of instructions including instructions which when executed by a computer system causes the computer system to perform:
generating a first data stream with first data packets containing data associated with stationary receivers and second data packets containing data associated with mobile receivers in a head-end, whereby second data packets at the start of a group of consecutively transmitted second data packets contain specific dummy bytes into which signaling information is filled;
transmitting said first data stream from said head-end to a plurality of transmitters;
extracting, by each transmitter, said signaling information from said second data packets indicating in which data slot and in which data sub-frame of a received data frame said second data packet is transferred;
inserting, by each transmitter, synchronization data in a specific data packet in each data slot containing second data packets; and
mapping said first and second data packets consecutively into a second data stream,
wherein each specific dummy byte with signaling data in the first two received second data packets is rewritten with a pre-selected value after extracting said signaling information.

77. The non-transitory computer-readable medium according to claim 76, wherein said specific data packet with synchronization data at the start of a received data frame is positioned at the start of an odd-numbered data field in said second data stream.

78. The non-transitory computer-readable medium according to claim 76, wherein said specific data packet with synchronization data in a data slot at an even-numbered position in a data frame is mapped to the first data packet of a data field in said second data stream.

79. The non-transitory computer-readable medium according to claim 76, wherein said specific data packet with synchronizing data in a data slot at an odd-numbered position in a received data frame is mapped to the 157$^{th}$ data packet of a data field in said second data stream.

80. The non-transitory computer-readable medium according to claim 76, wherein said first data stream comprises ATSC data frames and said second data stream includes VSB data fields and an ATSC-M/H group including 118 consecutively positioned second data packets in a data slot, the second data packets having data associated with mobile receivers.

81. The non-transitory computer-readable medium according to claim 76, wherein before extracting said signaling information from said second data packet identifying, by each transmitter, the first data packets and second data packets based on the corresponding packet identifier.

82. The non-transitory computer-readable medium according to claim 76, wherein after extracting said signaling information, decoding said signaling information using a cycle redundancy check information transmitted at the end of said signaling information to determine a correct transmission of said signaling information.

83. The non-transitory computer-readable medium according to claim 76,
wherein the specific data packet in each data slot in which synchronizing information is inserted is the 38$^{th}$ data packet of the data slot.

84. The non-transitory computer-readable medium according to claim 76,
wherein a number of received second data packets of an ATSC-M/H group is checked for completeness using a continuity counter in a header of each second data packet, and
wherein a number of second data packets containing a dummy data packet is inserted in said data slot corresponding to the number of lost second data packets in an ATSC-M/H group of said data slot.

85. The non-transitory computer-readable medium according to claim 76,
wherein the number of received first data packets of a data slot is checked for completeness, and
wherein a number of first data packets containing dummy data packets is inserted in said data slot corresponding to the number of lost first data packets in said data slot.

86. The non-transitory computer-readable medium according to any of claim 76,
wherein said signaling information further includes an ATSC system time associated with each transmitter.

87. The non-transitory computer-readable medium according to claim 76,
wherein said signaling information contains an information for switching each transmitter from a first operation mode in which data for mobile and stationary receivers are transmitted to a second operation mode in which only data for stationary receivers are transmitted.

88. The non-transitory computer-readable medium according to claim 87,
wherein after receiving a specific number of data frames of the first data stream without any identified second data packets, each transmitter is switched to said second operation mode.

89. A system for generating an inband signal, comprising:
a pre-processor configured to receive a plurality of transport stream packets, replace a plurality of specific dummy bytes of one or more of the plurality of transport stream packets with signaling data, and transmit the plurality of transport stream packets including the signaling data over a communications link; and
a post-processor in communication with the pre-processor through the communications link, configured to receive the plurality of transport stream packets including the signaling data, extract the signaling data, decode the signaling data, and identify at least one of a location of a mobile/handheld group, a subframe of the mobile/handheld group, and a slot number of the mobile/handheld group, based on the signaling data,
wherein each specific dummy byte with signaling data in the first two received transport stream packets is rewritten with a pre-selected value after extracting said signaling data.

90. The system of claim 89, wherein the post-processor is further configured to replace the signaling data with original values of the plurality of specific dummy bytes received by the pre-processor.

91. A method for using a mobile/handheld system to carry signaling information, comprising:
receiving, by a pre-processor, a plurality of transport stream packets;
replacing a plurality of specific dummy bytes of one or more of the plurality of transport stream packets with signaling data;
transmitting the plurality of transport stream packets including the signaling data over a communications link;
receiving, by a post-processor, the plurality of transport stream packets including the signaling data;
extracting the signaling data;
decoding the signaling data; and
identifying at least one of a location of a mobile/handheld group, a subframe of the mobile/handheld group, and a slot number of the mobile/handheld group, based on the signaling data,
wherein each specific dummy byte with signaling data in the first two received transport stream packets is rewritten with a pre-selected value after extracting said signaling data.

92. The method of claim 91, further comprising:
replacing, by the post-processor, the signaling data with original values of the plurality of specific dummy bytes obtained by the pre-processor.

93. A method for causing a pre-processor to generate an inband signal, comprising:
receiving a plurality of transport stream packets;
replacing a plurality of specific dummy bytes of one or more of the plurality of transport stream packets with signaling data;
transmitting the plurality of transport stream packets including the signaling data over a communications link to a post-processor configured to receive the plurality of transport stream packets including the signaling data;
extracting the signaling data;
decoding the signaling data; and
identifying at least one of a location of a mobile/handheld group, a subframe of the mobile/handheld group, and a slot number of the mobile/handheld group, based on the signaling data,
wherein each specific dummy byte with signaling data in the first two received transport stream packets is rewritten with a pre-selected value after extracting said signaling data.

94. A non-transitory computer-readable medium having stored thereon sequences of instructions, the sequences of instructions including instructions which when executed by a computer system causes the computer system to perform:
receiving a plurality of transport stream packets;
replacing a plurality of specific dummy bytes of one or more of the plurality of transport stream packets with signaling data;
transmitting the plurality of transport stream packets including the signaling data over a communications link to a post-processor configured to receive the plurality of transport stream packets including the signaling data;
extracting the signaling data;
decoding the signaling data; and
identifying at least one of a location of a mobile/handheld group, a subframe of the mobile/handheld group, and a slot number of the mobile/handheld group, based on the signaling data,
wherein each specific dummy byte with signaling data in the first two received transport stream packets is rewritten with a pre-selected value after extracting said signaling data.

95. A method for causing a post-processor to process an inband signal, comprising:
- receiving, from a communications link, a plurality of transport stream packets including signaling data;
- extracting the signaling data;
- decoding the signaling data; and
- identifying at least one of a location of a mobile/handheld group, a subframe of the mobile/handheld group, and a slot number of the mobile/handheld group, based on the signaling data,
- wherein the plurality of transport stream packets including signaling data is generated by a pre-processor configured to receive a plurality of transport stream packets, replace a plurality of specific dummy bytes of one or more of the plurality of transport stream packets with the signaling data, and transmit the plurality of transport stream packets including the signaling data onto a communications link, and
- wherein each specific dummy byte with signaling data in the first two received transport stream packets is rewritten with a pre-selected value after extracting said signaling data.

96. The method of claim 95, further comprising:
- replacing the signaling data with original values of the plurality of specific dummy bytes.

97. A non-transitory computer-readable medium having stored thereon sequences of instructions, the sequences of instructions including instructions which when executed by a computer system causes the computer system to perform:
- receiving, from a communications link, a plurality of transport stream packets including signaling data;
- extracting the signaling data;
- decoding the signaling data; and
- identifying at least one of a location of a mobile/handheld group, a subframe of the mobile/handheld group, and a slot number of the mobile/handheld group, based on the signaling data,
- wherein the plurality of transport stream packets including signaling data is generated by a pre-processor configured to receive a plurality of transport stream packets, replace a plurality of specific dummy bytes of one or more of the plurality of transport stream packets with the signaling data, and transmit the plurality of transport stream packets including the signaling data onto a communications link, and
- wherein each specific dummy byte with signaling data in the first two received transport stream packets is rewritten with a pre-selected value after extracting said signaling data.

98. The non-transitory computer-readable medium of claim 97, having stored thereon instructions which cause the computer system to perform:
- replacing the signaling data with original values of the plurality of specific dummy bytes obtained by the pre-processor.

\* \* \* \* \*

UNITED STATES PATENT AND TRADEMARK OFFICE
CERTIFICATE OF CORRECTION

| | |
|---|---|
| PATENT NO. | : 8,774,069 B2 |
| APPLICATION NO. | : 12/468938 |
| DATED | : July 8, 2014 |
| INVENTOR(S) | : Herzog et al. |

It is certified that error appears in the above-identified patent and that said Letters Patent is hereby corrected as shown below:

On the Title Page in the illustrative figure "tranmitted" should read -- transmitted --.

Page 3, (56) FOREIGN PATENT DOCUMENTS

"2004/062183" should read -- WO-2004/061283 --.
"2008/100000" should read -- WO-2008/100000 --.
"2008/117981" should read -- WO-2008/117981 --.

(56) OTHER PUBLICATIONS

Beginning with Citta, R., et al., "Montreuz" should read -- Montreux --.

In the Drawings

SHEET 1 of 5

Fig. 1, Segment 10i, "(optional" should read -- (optional) --.

SHEET 5 of 5

FIG. 6, S80, "tranmitted" should read -- transmitted --.

In the Specification

COLUMN 1

Line 36, "remote" should read -- remotely --.

Signed and Sealed this
Twenty-fifth Day of August, 2015

Michelle K. Lee
*Director of the United States Patent and Trademark Office*

COLUMN 3

Line 14, "in case of" should read -- in the case of --.
Line 19, "In case of" should read -- In the case of --.
Line 23, "a odd-numbered" should read -- an odd-numbered --.
Line 30, "In case of" should read -- In the case of --.
Line 40, "In case of" should read -- In the case of --.

COLUMN 4

Line 22, "in case of" should read -- in the case of --.
Line 30, "corresponding" should read -- corresponding to --.
Line 34, "contains fol-" should read -- contain the fol- --.
Line 45, "both data" should read -- data --.
Line 60, "In case" should read -- In the case of --.
Line 62, "information are" should read -- information is --.

COLUMN 5

Line 27, "cause" should read -- causes --.
Line 27, "pre-processor," should read -- pre-processor --.
Line 47, "is generated" should read -- are generated --.
Line 48, "replace" should read -- replaces --.
Line 52, "medium" should read -- media --.

COLUMN 6

Line 7, "FIG. 6," should read -- FIG. 6 --.
Line 47, "security reason" should read -- security reasons --.

COLUMN 7

Line 8, "each a" should read -- each --.
Line 33, "In case of" should read -- In the case of --.

COLUMN 8

Line 7, "in case of" should read -- in the case of --.
Line 26, "to following" should read -- to the following --.

In the Claims

COLUMN 11

Line 50, "an informa-" should read -- informa- --.

COLUMN 16

Line 6, "causes" should read -- cause --.
    Line 60, "causes" should read -- cause --.

COLUMN 19

Line 30, "identifying" should read -- each transmitter identifies --.

COLUMN 20

Line 9, "causes" should read -- cause --.

COLUMN 22

Line 49, "causes" should read -- cause --.

COLUMN 23

Line 28, "causes" should read -- cause --.